United States Patent

Lo Biondo et al.

[11] 3,893,384
[45] July 8, 1975

[54] CURED MEAT PROCESSING MACHINE

[76] Inventors: Salvatore J. Lo Biondo, 12 Decamp Ct., West Caldwell, N.J. 07006; Joseph V. Lo Biondo, 12 Winding Ln., Bloomfield, N.J. 07003

[22] Filed: May 17, 1973

[21] Appl. No.: 361,231

[52] U.S. Cl. .................................. 99/485; 99/357
[51] Int. Cl. ............................................... A22c 9/00
[58] Field of Search ................... 99/485, 501–502, 99/509, DIG. 6, 357; 17/25–26, 27–28, 29–30, 31; 425/280–281, 311–313, 385; 83/11–12, 113, 122

[56] References Cited
UNITED STATES PATENTS

| | | | |
|---|---|---|---|
| 1,531,000 | 3/1925 | Goodwin | 17/25 UX |
| 2,279,072 | 4/1942 | Spang | 83/122 X |
| 2,291,809 | 8/1942 | Jackson | 83/11 |
| 2,318,897 | 5/1943 | Spang | 83/11 X |
| 2,471,062 | 5/1949 | Davis | 17/25 X |
| 3,207,016 | 9/1965 | Huff | 83/12 |

*Primary Examiner*—Robert L. Bleutge
*Assistant Examiner*—Arthur O. Henderson
*Attorney, Agent, or Firm*—Harry B. Rook

[57] ABSTRACT

A machine for macerating a piece of meat includes a frame on which is mounted a gang of circular blades on a shaft rotatable above an inclined meat-supporting table and presser device which is adjustably relative to the blades, and a pressure device comprising a beam easily and quickly separably mounted on the frame above the blades and a channelshaped pressure plate device whose bottom wall is flat to be engaged by the meat and has a slot for each blade and whose flanges are easily and quickly adjustably connected to the beam to vary the extent of upward projection of the meat between the blades and to prevent the blades from lifting the meat from the table.

5 Claims, 2 Drawing Figures

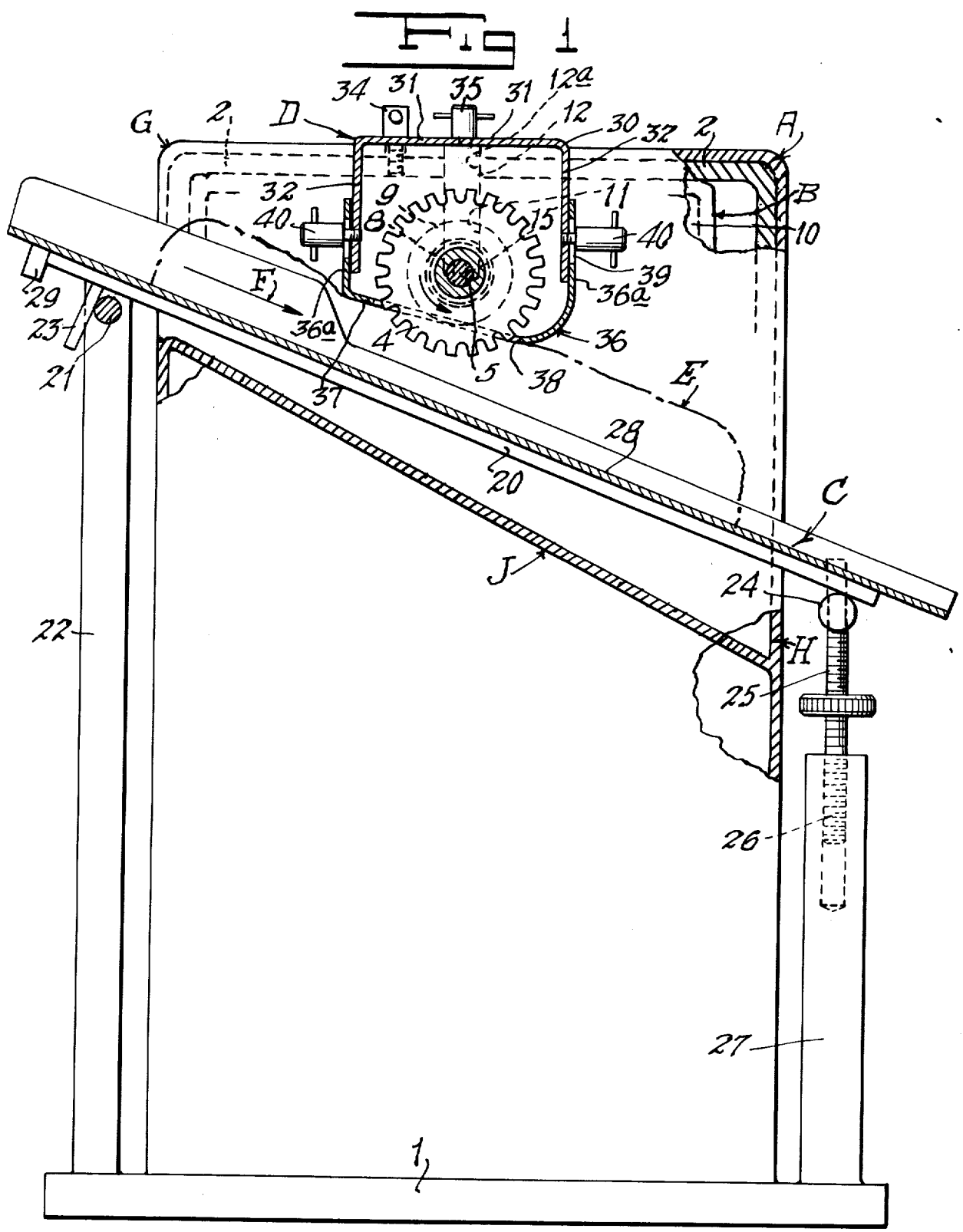

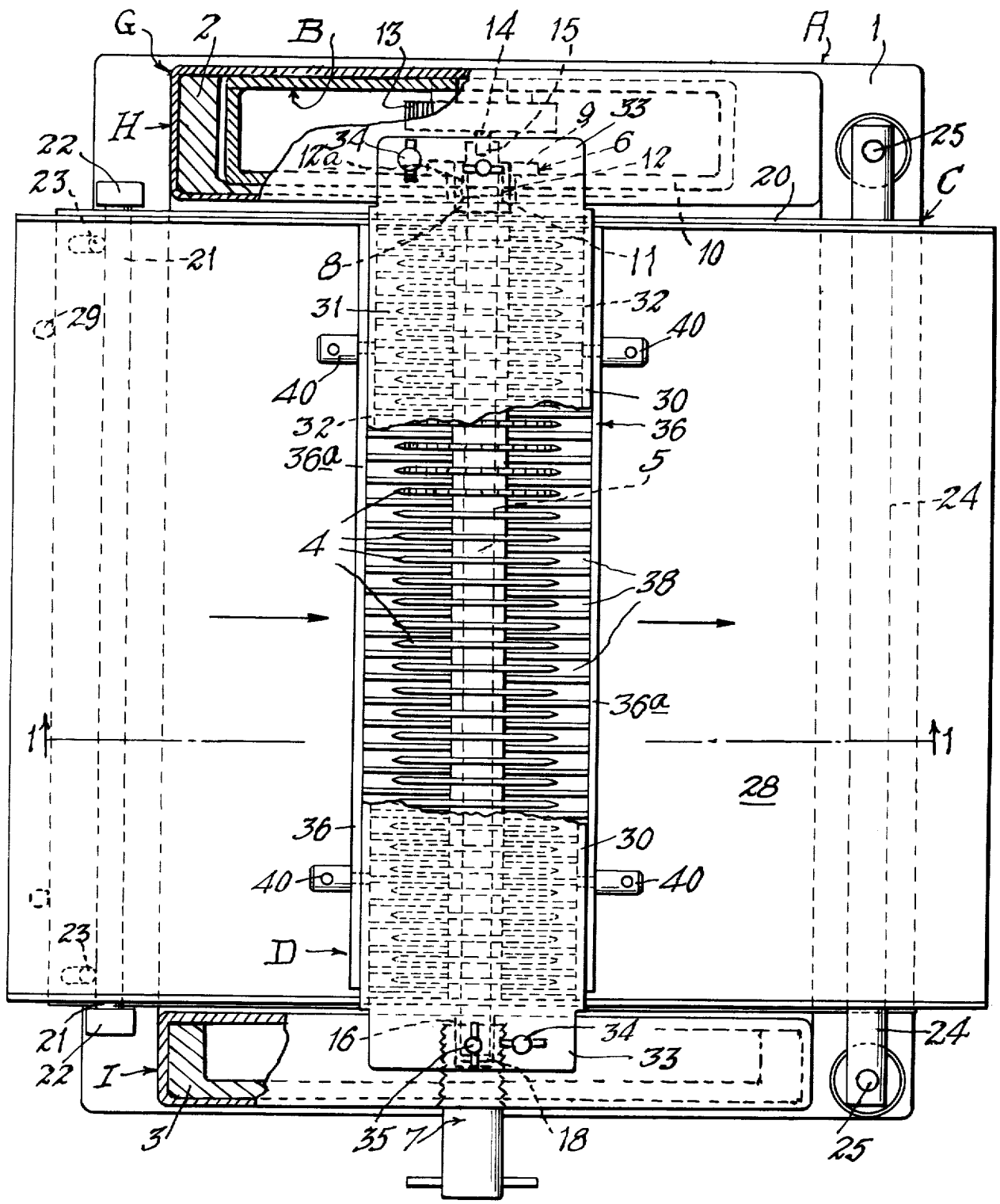

CURED MEAT PROCESSING MACHINE

BACKGROUND OF THE INVENTION

This invention relates to a machine for macerating or making a plurality of slits, cuts or scores in self-sustaining but soft pieces of meat for any desired purpose, for example, to prepare pieces of ham as a preliminary step in the method of producing cooked ham described and claimed in our U.S. Pat. No. 3,644,125.

Machines are known in the prior art for slitting meat to produce, for example, cubed steaks or to tenderize pieces of meat; and such machines include rotary knives or blades on a common shaft above a support or table for the pieces of meat along which said pieces are slid beneath the rotating knives or blades.

Some machines of this character include so-called stripper devices to prevent the meat from sticking to the blades or in other words to strip the meat from the knives and also to hold the pieces of meat against being lifted off the support or table by the blades.

However, these known machines leave much to be desired in that they are complicated and expensive in construction and operation, or either they do not permit positive adjustment of the stripper relative to the support to vary the pressure on the meat or the extent of the upward projection of the top surface of the piece of meat between the rotating blades or the making of such adjustments as are possible is too complicated, mechanically difficult and time consuming.

SUMMARY OF THE INVENTION

A primary object of the present invention is to provide a meat processing machine which overcomes the objections to and disadvantages of the prior machines and is simple and inexpensive in construction and which includes a device having a flat pressure plate provided with slots for the rotary blades and adapted to be adjusted easily and quickly on the machine frame and positively held in adjusted positions to cause the pieces of meat to be pressed between said pressure plate and a table on said frame along which said piece is slid by and beneath the rotating blades thereby to limit and easily vary the extent of the upward projection of the top surface of said piece between the blades and consequently limit the distance of penetration of said piece by said blades.

The invention also contemplates a machine of the character described which includes a frame having a base on which is adjustably mounted a table for the meat pieces and from which upwardly extend oppositely disposed supports for bearings for a shaft on which the blades are mounted above said table. On said supports is separably mounted an inverted channel-shaped beam that covers and embraces between its side flanges the rotating knives, and manually adjustably mounted on said flanges is a channel-shaped pressure device whose bottom wall is substantially flat and has slots through each of which projects one of said blades whereby the pressure device can be easily and quickly raised and lowered on said beam to adjust said pressure plate relative to the blades and thus vary the extent of upward projection between the blades of a piece of meat on the table.

The invention provides the adjustable pressure device and the adjustable table so that the piece of meat is at the same time subjected to maceration and to pressure between the pressure device and the presser table to bring to the surface of the meat the natural myocin as the result of which the macerated surfaces of two pieces of meat may be bonded together, for example, to produce canned ham as described and claimed in our U.S. Pat. No. 3,644,125 and eliminate the use of gelatin from other sources than the macerated meat.

BRIEF DESCRIPTION OF THE DRAWINGS

For a more complete understanding of the invention, reference may be had to the following description in conjunction with the accompanying drawing in which:

FIG. 1 is transverse vertical sectional view approximately on the plane of the line 1—1 of the FIG. 2.

FIG. 2 is a top plan view of a meat processing machine embodying the invention.

DESCRIPTION OF THE PREFERRED EMBODIMENT

Specifically describing the invention, the machine includes a frame A having a base 1 from which upwardly extends oppositely disposed supports 2 and 3 for a gang of blades which are shown as circular rotary toothed disks mounted on shaft 5 in spaced relation to each other longitudinally of the shaft. The shaft is mounted in bearings 6 and 7 in the respective supports 2 and 3, and desirably the bearings are removable so that the shaft with the blades thereon can be easily mounted on and removed from the supports for changing or cleaning of the blades.

It is desirable that the supports be covered by a removable case G which includes two sections H and I each removably telescopically fitted over one support 2 or 3 and connected together by a web section J to protect the supports and the base from accumulations of meat juices and dirt. The case can be easily removed for cleaning after the blade shaft has been removed as hereinafter described.

While the construction of the removable bearings may be varied, one of the bearings, in the present instance bearing 6, is schematically shown as comprising a sleeve 8 passing loosely through an opening in the support 2 and screw threaded into a bearing part 9 rigidly mounted on the wall 10 of a drive gear box B secured in the support 2. Opening through the top walls of the case section H, gear box B and support Z are the respective slots 11, 12 and 12a extending upwardly in line from the shaft 5 as best shown in FIG. 2 so that the shaft may be bodily lifted vertically through said slots. The end of the shaft 5 has a separably driving connection with one of the drive gears 13 of any suitable motor drive mechanism, said gear being shown as having a diametral fin 14 projecting from one face thereof to enter a transverse slot 15 in the end of the shaft.

The other support 3 has a slot 16 similar to the slots 12 and 12a through which the corresponding end of the shaft may be vertically moved, and the bearing 7 is screw threaded into the support 3 coaxially with the inner end of slot 16 and has a bearing socket 18 for the end of the shaft. With this construction, when it is desired to remove the blade shaft 5, the bearing part 7 and bearing sleeve 8 are unscrewed from the support 3 and the gear box wall 10 respectively to free the ends of the shaft which may then be moved horizontally and vertically lifted through the slots 12, 12a and 16 out of the supports 3 and 2.

For supporting and guiding the pieces of meat to be processed, that is macerated or slitted, by the blades, there is a table or support generally designated C which is shown as comprising a presser plate 20 hingedly connected at its upper end to a horizontal rod 21 that is mounted on parallel and spaced standards 22 projecting upwardly from the base 1, there being studs 23 secured to the under side of the plate 20 and swingably engaging the rod 21 as best shown in FIG. 2. The plate is inclined transversely of the machine with its hinged end uppermost and its other end relatively slidably rests on a transverse cylindrical rod 24 through which extend adjusting screws 25 which are screw-threaded at 26 in posts 27 projecting upwardly from the base 1. With this construction, the plate 20 may be moved upwardly and downwardly by simple rotation of the screws 25. Separably mounted on the presser plate 20 is a sheet metal chute 28 along which the piece of meat is slid by and beneath the blades rotating in the direction of the arrow. The chute may be separably mounted on the presser plate in any suitable manner but is shown as having dependent studs 29 at its higher meat-receiving end which abut the higher edge of the presser plate.

An important feature of the invention is a device D which is shown as comprising an inverted channel-shaped beam 30 which includes a main or bottom wall 31 and depending side flanges 32 with the end portions of the main wall 31 extending beyond the flanges as indicated at 33 and resting upon the top walls of the supports 2 and 3. For rigidly but separably securing the beam on the supports in overlying relation to the blades, clamping screws 34 are provided having screw threaded shank portions passing through openings in the extensions 33 of the wall 31 of the beam and screw-threaded into the corresponding supports, with the heads of the screws abutting the extensions 33. Desirably handles 35 which may be formed of screws are provided on the extensions 33 for convenience in handling the beam.

On the flanges 32 of the beam is separably and adjustably mounted a channel-shaped pressure plate device 36 whose bottom wall 37 constitutes a pressure plate and has slots 38 each corresponding to one of the knives 4 and adapted to have the blade extend therethrough as best shown in FIG. 2. For mounting the pressure plate device on the beam, the flanges 36a of the pressure plate device are formed with slots 39 through each of which extends the threaded shank of a headed screw 40 with the shank screwed into the corresponding side wall 32 of the beam and the head abutting the corresponding flange of the pressure plate device 36 as best shown in FIG. 2. With this construction, the pressure plate device can be easily and quickly moved upwardly on the beam into any desired adjusted position with respect to the chute 28 to accommodate pieces of meat shown by broken lines in FIG. 2 and designated E.

In operation of the machine, the drive mechanism for the blades is started to rapidly rotate the blades in the direction of the arrow shown in FIG. 2, and the pieces of meat to be processed are separately slid onto the chute at the high end thereof into contact with the blades and are drawn by and beneath the blades in the direction of the arrow that is designated F, the piece of meat being pressed and held by the presser plate 20 against the blades and the portions of the pressure plate 37 of the device 36 which abut the top surface of the meat between the blades so as to limit the extent of upward projection of the meat between the blades. The pressure plate also serves to hold the meat against being lifted from the chute and effectively prevents the meat from sticking to the blades.

It will also be observed that the beam and the device 36 almost entirely enclose the blades when they are mounted in the machine, so as to reduce the possibility of contact of the operators fingers or extraneous objects with the rapidly rotating blades.

It will be observed that the pressure of the meat between the pressure device and the presser table and the extent of penetration or maceration of the meat and consequent release of myocin can be varied by adjustment of the chute 28 through manipulation of the screws 28, and by adjustment of the pressure device 36 on the beam by loosening the screws 40 to permit raising or lowering the device and then tightening the screws to hold the device in adjusted positions.

As hereinbefore indicated, the myocin is brought to the surface of the meat so that the macerated surfaces of two pieces of meat can be firmly bonded together under pressure without the use of gelatin, for example, in the production of canned ham, as taught by our U.S. Pat. No. 3,644,125.

While the now preferred embodiment of the invention has been illustrated and described; it should be understood that this is primarily to explain the principles of the invention, and modifications and changes in the construction of the machine can be made within the spirit of the invention and the scope of the appended claims.

We claim:

1. A meat processing machine comprising a frame having spaced and opposed vertical supports, a horizontal mascerating blade shaft removably rotatably journaled in said supports and having a plurality of circular blades mounted thereon in spaced apart relation longitudinally thereof, a meat-supporting table removably mounted on said frame beneath said blades along which a piece of meat may be slid in contact with said blades for slitting said meat, a pressure device including an inverted channel shaped beam having a main wall separably and rigidly secured at its ends on said supports, respectively, above said shaft and blades and having depending spaced and parallel side walls covering and embracing said blades, and a channel-shaped pressure plate device having a flat bottom wall and parallel side flanges mounted on said beam with said bottom wall beneath said shaft to be engaged by the top surface of said meat, said bottom wall having slots through each of which extends one blade and said flanges extending upwardly in sliding contact with the respective side walls of the beam, and means adjustably securing said flanges to said side walls for up and down movement of said bottom wall.

2. The meat processing machine as defined in claim 1 wherein said main wall of the beam has end extensions beyond said side walls resting on the top surfaces of said supports, respectively, and there are screws having heads and shanks with the shanks passing through openings in said extensions and screwed into said supports and the heads tightened against said extensions.

3. The meat processing machine as defined in claim 1 wherein said flanges of the pressure plate have slots and there are headed screws each having its shank passing through one slot and screwed into the corresponding side wall of the beam and having its head tightened against the corresponding flange.

4. The meat processing machine as defined in claim 1 wherein said table is separably swingably mounted at its meat receiving end on said frame and is inclined downwardly beneath said blades to swing toward and away from said flat wall of the pressure plate, and with the addition of means for adjustably supporting the lower discharge end of the table on the frame to hold the table in the desired spaced relation to said pressure plate.

5. The meat processing machines as defined in claim 1 with the addition of a case including two sections each removably telescopically fitted over one of said supports and connected together by a web section underlying said table.

* * * * *